(12) United States Patent
McEldowney et al.

(10) Patent No.: US 9,291,449 B2
(45) Date of Patent: *Mar. 22, 2016

(54) DETECTION OF CONFIGURATION CHANGES AMONG OPTICAL ELEMENTS OF ILLUMINATION SYSTEM

(71) Applicant: MICROSOFT TECHNOLOGY LICENSING, LLC, Redmond, WA (US)

(72) Inventors: Scott McEldowney, Redmond, WA (US); Dawson Yee, Medina, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 151 days.

This patent is subject to a terminal disclaimer.

(21) Appl. No.: 14/089,750

(22) Filed: Nov. 25, 2013

(65) Prior Publication Data
US 2014/0160493 A1    Jun. 12, 2014

Related U.S. Application Data

(63) Continuation of application No. 12/938,254, filed on Nov. 2, 2010, now Pat. No. 8,592,739.

(51) Int. Cl.
*G01B 11/14* (2006.01)
*G01J 1/02* (2006.01)
*G01J 1/32* (2006.01)

(52) U.S. Cl.
CPC ............... *G01B 11/14* (2013.01); *G01J 1/0228* (2013.01); *G01J 1/32* (2013.01)

(58) Field of Classification Search
CPC .. H04N 5/2256; G01B 11/14; G01B 9/02061; G01J 1/4257
USPC ................ 250/221, 216, 201.2, 214.1, 559.1, 250/559.46; 348/352, 347, 351; 356/622, 356/239.2
See application file for complete search history.

(56) References Cited

U.S. PATENT DOCUMENTS 4,627,620 A    12/1986  Yang
4,630,910 A    12/1986  Ross et al.
(Continued)

FOREIGN PATENT DOCUMENTS

CN    1159048 A    9/1997
CN    1169009 A    12/1997
(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

(Continued)

*Primary Examiner* — Que T Le
(74) *Attorney, Agent, or Firm* — Gregg Wisdom; Judy Yee; Micky Minhas (57) ABSTRACT

Technology for detecting a change in a configuration position of one or more elements in an illumination system is described. A light source generates an illumination signal, and an element of the system directs a portion of the light of the signal back to a light detector. In one example, the portion of light is reflected back to the light detector. By monitoring an output signal of the light detector based on the directed light, control circuitry can detect that a position of an element of the system has changed. In one example, an off-the-shelf integrated circuit laser diode package including a monitor photodiode can be used with a reflective element. In one example, the reflective element is a tilted optical element. Changes can be detected in the configuration of one or more optical elements of the illumination system which are outside the laser diode package.

20 Claims, 8 Drawing Sheets

(56) References Cited

U.S. PATENT DOCUMENTS

| | | | |
|---|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,190,175 A | 3/1993 | Schmidt |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,306,903 A * | 4/1994 | Yamamuro et al. ........ 250/201.5 |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,569,904 A | 10/1996 | Meyers |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,810,135 B1 | 10/2004 | Berenz et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,210,859 B2 | 5/2007 | Kumar et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,388,486 B2 | 6/2008 | Dalzell et al. |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,443,587 B2 | 10/2008 | Dickson et al. |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,518,507 B2 | 4/2009 | Dalzell et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |

(56) References Cited

U.S. PATENT DOCUMENTS

| | | | |
|---|---|---|---|
| 7,590,262 | B2 | 9/2009 | Fujimura et al. |
| 7,593,552 | B2 | 9/2009 | Higaki et al. |
| 7,598,942 | B2 | 10/2009 | Underkoffler et al. |
| 7,607,509 | B2 | 10/2009 | Schmiz et al. |
| 7,620,202 | B2 | 11/2009 | Fujimura et al. |
| 7,668,340 | B2 | 2/2010 | Cohen et al. |
| 7,680,298 | B2 | 3/2010 | Roberts et al. |
| 7,683,954 | B2 | 3/2010 | Ichikawa et al. |
| 7,684,592 | B2 | 3/2010 | Paul et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2003/0057355 | A1 | 3/2003 | Wang |
| 2004/0228577 | A1 | 11/2004 | Pezeshki |
| 2006/0249651 | A1 | 11/2006 | Kurata et al. |
| 2008/0026838 | A1 | 1/2008 | Dunstan et al. |
| 2009/0039235 | A1 | 2/2009 | MacFarlane et al. |
| 2010/0006741 | A1 | 1/2010 | Nishioka |

FOREIGN PATENT DOCUMENTS

| | | |
|---|---|---|
| CN | 1395677 A | 2/2003 |
| CN | 1738117 A | 2/2006 |
| CN | 1800836 A | 7/2006 |
| CN | 101254344 B | 6/2010 |
| EP | 0583061 A2 | 2/1994 |
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, pp. 90-102, University of Texas at Austin, Austin, TX.

Shao et al., "An Open System Architecture for a Multimedia and Multimodal User Interface", Aug. 24, 1998, 8 pages, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/ Germany, 1996, pp. 147-154, Germany.

Kohler, "Technical Details and Ergonomical Aspects of Gesture Recognition applied in Intelligent Home Environments", 1997, 35 pages, Germany.

Hasegawa et al., "Human-Scale Haptic Interaction with a Reactive Virtual Human in a Real-Time Physics Simulator", Jul. 2006, 12 pages, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, 121 pages, The Robotics Institute, Carnegie Mellon University, Pittsburgh, PA.

He, "Generation of Human Body Models", Apr. 2005, 111 pages, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, 145 pages, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, pp. 602-605, vol. 15, No. 6, IEEE Transactions on Pattern Analysis and Machine Intelligence.

Granieri et al., "Simulating Humans in VR", The British Computer Society, Oct. 1994, pp. 1-4, 6-9, 12, 15-16, and 18-21 (15 pages) Academic Press.

Brogan et al., "Dynamically Simulated Characters in Virtual Environments", Sep./Oct. 1998, pp. 58-69, vol. 18, Issue 5, IEEE Computer Graphics and Applications.

Fisher et al., "Virtual Environment Display System", ACM Workshop on Interactive 3D Graphics, Oct. 1986, 12 pages, Chapel Hill, NC.

"Virtual High Anxiety", Tech Update, Aug. 1995, pp. 22.

Sheridan et al., "Virtual Reality Check", Technology Review, Oct. 1993, pp. 21-28, vol. 96, No. 7.

Stevens, "Flights into Virtual Reality Treating Real-World Disorders", The Washington Post, Mar. 27, 1995, Science Psychology, 2 pages.

"Simulation and Training", 1994, 6 pages, HP Division Incorporated.

English Machine-translation of Japanese Publication No. JP08-044490 published on Feb. 16, 1996.

Chang, W.C., K.F. Yarn and W.C. Chuang. "The Use of Soft-Lithography Technique Associated with Semiconductor Light Source for the New Optical Design," Digest Journal of Nanomaterials and Biostructures, Apr.-Jun., 2010, pp. 433-439, vol. 5, No. 2. Forum of Chalcogeniders / National Institute R&D of Materials Physics: Bucharest, Romania.

Retroreflector—Wikipedia, the free encyclopedia Wikipedia, "Retroreflector," last modified Nov. 1, 2010, retrieved from Internet on Nov. 2, 2010: <http://en.wikipedia.org/wiki/Retro-reflector>, 7 pages.

Toyama, et al., "Probabilistic Tracking in a Metric Space," Eighth International Conference on Computer Vision, Vancouver, Canada, vol. 2, Jul. 2001, 8 pages.

Office Action dated Jan. 18, 2013 in U.S. Appl. No. 12/938,254, 40 pages.

Response to Office Action filed Apr. 18, 2013, U.S. Appl. No. 12/938,254, 11 pages.

Notice of Allowance dated Jul. 9, 2013 in U.S. Appl. No. 12/938,254, 9 pages.

Supplemental Notice of Allowance dated Oct. 28, 2013 in U.S. Appl. No. 12/938,254, 4 pages.

"First Office Action Issued in Chinese Patent Application No. 201110352669.3", Mailed Date: Dec. 8, 2014, 11 Pages.

\* cited by examiner

DETECTION OF CONFIGURATION CHANGES AMONG OPTICAL ELEMENTS OF ILLUMINATION SYSTEM

This application is a continuation of and claims benefit of U.S. Ser. No. 12/938,254 filed Nov. 2, 2010 and later issued as U.S. Pat. No. 8,592,739 on Nov. 26, 2013, where the contents of said priority application are incorporated herein by reference and in their entirety.

BACKGROUND

Illumination systems are used in many applications. For example, they can be used in depth camera systems such as time-of-flight (TOF) cameras, lidar systems, and spectrometers. An illumination system includes a light source such as a laser or a light emitting diode (LED). Typically, additional optical or light processing elements such as lenses and mirrors are incorporated in the optical design of the illumination system. For example, these light processing elements can be used to direct the light of the light source to a target location or to spread the light over a target area. If the configuration of the optical elements is changed whether due to tampering or unintended damage, the illumination system does not work as intended for its optical design, and may cause a safety hazard.

SUMMARY

The technology provides for detection of a change of position of an element configured in an illumination system. In particular, the technology can detect removal of, damage to or position changes in the elements of the illumination system. A light source generates an illumination signal and an element of the illumination system directs a portion of light of the illumination signal to a light detector. In some embodiments, the element reflects a portion of the light back. Additionally, the light may be directed to the light detector by techniques other than reflection such as diffraction. The light detector generates an output signal based on the reflected light, and control circuitry monitors the output signal for detection of a change in a configuration position of one or more elements of the illumination system.

In one example, the illumination signal is collimated by one or more collimating lenses and a portion of light from the signal is reflected by a tilted optical element. The reflected light passes through the one or more collimating lenses again. The light will shift or translate in relation to the tilt angle in a way that all or most of the reflected light is focused back to the source but shifted by an amount or distance. A light detector can be placed at the location of the shift or translation, typically near the source, and the light detector can measure the reflected light. By controlling the tilt angle, good control of where reflected light is directed makes it sensitive to changes in the illumination system.

Reflecting the light back near the source permits use of already existing, commercially and widely available light source packages such as laser diode packages including monitor photodiodes positioned near the light source. By being able to receive the reflected light at the monitor photodiode, an effect or change outside the light source package can be detected by a standard component within an off-the-shelf light source package.

In some embodiments, the control circuitry modifies operation of the illumination system responsive to detecting the change in the configuration position. An example of modified operation is turning off the light source.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

An illumination system typically includes a light source and one or more optical elements. The light source may be an off-the-shelf package, for example a standardized, commercially available package, including the light source and supporting circuitry fabricated using integrated circuit technology. Depending on the application, a designer of the illumination system configures one or more optical elements, for example mirrors and lenses, in positions to receive and process the light. Another example of an element is a light blocking element. Other elements of the system can include structural elements like support structures on which the various elements are mounted, attached or supported in position. If the position of these elements is changed in the configuration, for example by significant movement, damage, or removal, the operation of the illumination or optical system is likely to be significantly compromised.

The technology detects a change in a configuration position of one or more elements in an illumination system by monitoring a portion of light of an illumination signal directed back to a light detector. When a laser is used as the light source, the laser generates light or illumination which propagates mostly in one direction, referred to as forward, but also a smaller portion of light in an opposite direction to make up a reverse illumination signal. Conventionally, a monitor photodiode monitors the reverse illumination signal as an indicator of the output power of the illumination signal for a laser. The forward illumination signal is the signal typically used by illumination systems in a wide variety of applications such as in cameras, lidars, spectrometers, etc. and is the signal referenced by the term illumination signal.

An element of the illumination system directs a portion of the light of the signal back to the light detector. One way to direct a portion of the light is to reflect the light. Some embodiments take advantage of the inherent surface reflection of the light off of optical elements. Surface reflected light that is minimally scattered provides intensity measurements of surface reflected light that are easily detected over environmental factors such as noise. The light detector generates an output signal based on the measurements of the light received back from the element. The output signal of the light detector is monitored to detect that a position of an element of the system has changed.

In some examples, an off-the-shelf integrated circuit light source package such as that for a laser diode package which includes a monitor photodiode can be used to monitor changes outside the package. In other words, changes can be detected in the configuration of one or more optical elements of the illumination system which are outside the package.

Figure 1A:
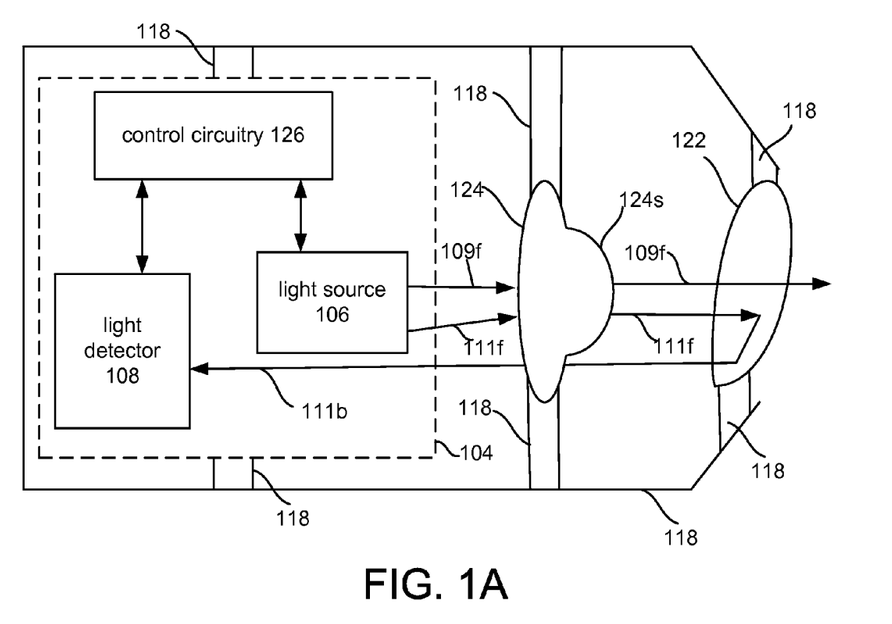
FIG. 1A is a block diagram of an embodiment of an illumination system comprising technology for detection of a change in the configuration of its elements.

FIG. 1A is a block diagram of an embodiment of an illumination system comprising technology for detection of a change in the configuration of its elements. An outer structure 118 provides support for optical elements 124 and 122 and a package of a case or can 104 including integrated circuitry comprising a semiconductor light source 106, control circuitry 126 and a light detector 108. The optical elements 124 and 122 are representative of lenses in this embodiment, but other optical or light processing elements (e.g. mirrors) may be used as per a particular optical design. Additionally, the illustrated lenses 124 and 122 may represent an optical subsystem of one or more optical elements.

The light source 106 generates an illumination signal, in this example represented as dispersive rays 109f and 111f. Semiconductor diodes such as laser diodes and light-emitting diodes (LEDs) typically generate dispersive light beams unlike gas or crystal lasers which generate highly collimated beams. A collimating lens 124 collimates the divergent light as illustrated.

Optical element 122 is a tilted optical element which reflects a portion of the collimated light. The tilt is not drawn to scale. In example configurations of an illumination system such as that shown in FIG. 1A and FIGS. 2 and 4, the tilt angle may be two to three (2-3) degrees. The reflected light 111b passes again through the one or more collimating lenses represented by lens 124. In relation to the tilt angle, the reflected light 111b travels to a location translated from, but near, the light source 106 where light detector 108 is located.

Light detector 108 is positioned to receive the reflected light 111b. For example, as shown it is near, in this case behind, the light source 106 but extends beyond the area of the light source 106 and receives ray 111b. The intensity measurement on the light detector will be higher due to the minimal scattering of the specularly reflected light than for light simply scattered back to the detector.

Figure 1B:
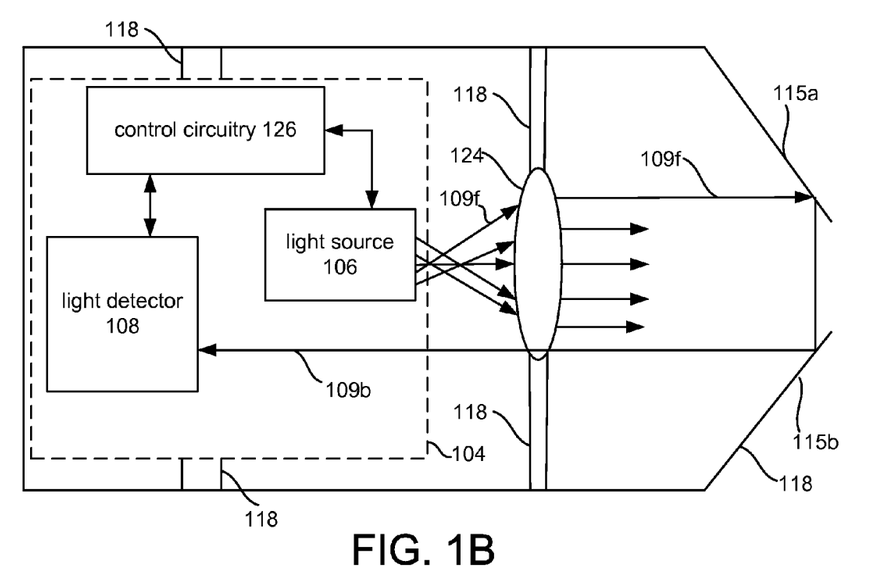
FIG. 1B is a block diagram of another embodiment of an illumination system comprising technology for detection of a change in the configuration of its elements.

FIG. 1B is a block diagram of another embodiment of an illumination system comprising technology for detection of a change in the configuration of its elements. In this example, divergent ray 109f is collimated by one or more lenses 124 and travels and intersects with a reflective area 115a on a surface on an interior side of the outer structure 118. A reflective area 115a, 115b may be coated with a paint or coating which directs the light 109b back to the light detector 108 through the one or more collimating lenses 124. The structure 118 may include a reflective area of coatings or mirrors in portions 115a and 115b. In one example, three mutually perpendicular mirrors on the interior sides of portions 115a and 115b and in this view, above and below these portions, may form a trapezoid which is an incomplete corner of a cube due to the opening for the illumination signal between 115a and 115b. Hence, a corner reflector is effectively formed as a reflective element.

Figure 2:
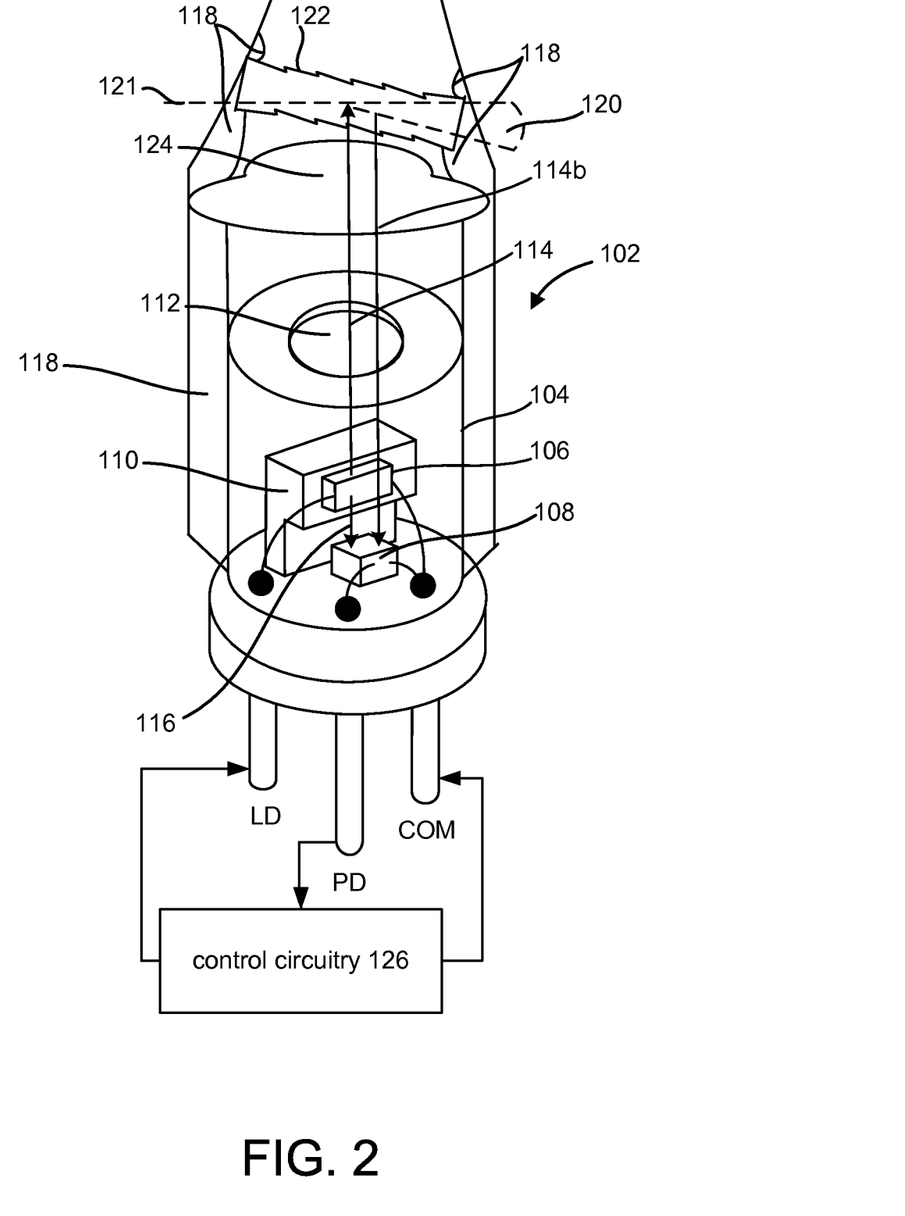
FIG. 2 is a block diagram in a perspective view of an embodiment of a laser diode illumination system which can detect a change in the configuration of its elements.
Figure 4:
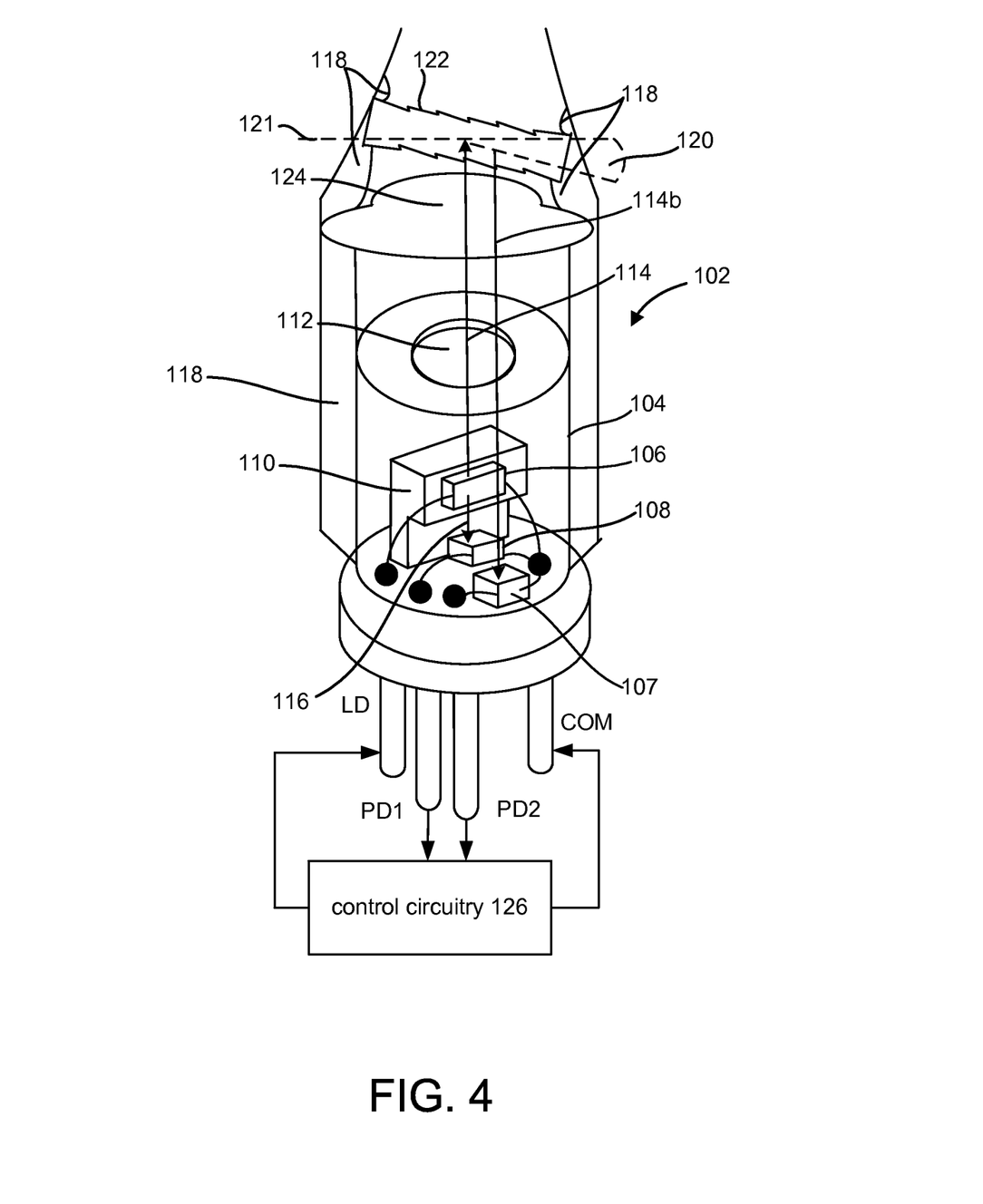
FIG. 4 is a block diagram in a perspective view of another embodiment of a laser diode illumination system comprising technology for detection of a change in the configuration of its elements.

FIG. 2 is a block diagram in a perspective view of an embodiment of a laser diode illumination system comprising technology for detection of a change in the configuration of its elements. The disclosure with respect to FIGS. 2 and 4 is equally applicable to configurations with light-emitting diodes, which can share similar configurations to those depicted in FIGS. 2 and 4.

In FIG. 2, outer structural element 118 of the illumination system supports optical elements 124 and 122. Lens 124 is representative of one or more optical elements for collimating light beam 114. Tilted optical element 122 (not drawn to scale) has a tilt angle 120 measured from an axis 121 perpendicular to a direction of propagation of the illumination signal. As mentioned for FIG. 1A, in this example, the tilt angle may be between two to three degrees. Of course, other tilt angles may be used and different reflection arrangements according to design choice of the optical illumination system. Optical element 122 can be implemented by one or more elements.

In this example, the optical element 122 represents one or more diffractive optical elements. A diffraction grating for the diffractive element 122 provides a non-uniform or rough surface which directs light, for example surface reflects light back, toward the light detector.

FIG. 2 also shows a typical laser diode package in a perspective view. The laser diode package 102 includes the case 104 (also called a can) which houses a die for laser diode 106, a die for monitor photodiode 108 and a heat sink 110. Heat sink 110 is used to dissipate heat generated by the laser diode die. The case includes a window 112 through which the laser beam or illumination signal generated by the laser diode die passes. The laser beam is represented by arrow 114 in FIG. 2. Of course, the beam 114 may represent a divergent beam of non-collimated light when leaving the laser diode 106. Generally, laser diodes will emit power from both ends of the resonant cavity in which the diode structure is contained. The beam or emissions from the rear facet of the laser diode in FIG. 2 is represented by arrow 116. The rear emission or reverse illumination signal from laser diode 106 is received by a monitor photodiode 108. The photodiode utilizes optical charge carrier generation to sense and measure the light produced by the laser diode. Additionally, the monitor photodiode 108 receives the reflected light represented by 114b.

Changes to a property of the measured light are detectable by the monitor photodiode 108. In one example, the property is the intensity or amount of the measured light. In one example, about a twenty-five percent decrease in the intensity of the light is an indicator or detector that the position of at least one of the elements, for example the optical elements 122 and 124 or the structural element 118 has had a change of position from its original configuration in the illumination system. The element may have been removed, damaged, or repositioned to cause a non-negligible effect.

As shown in the example of FIG. 2, off-the-shelf or multipurpose commercially available laser packages are used to detect changes in a configuration position of one or more elements outside the integrated circuit package. A monitor photodiode is standard for laser diode packages. A package need not be specially designed and fabricated for detecting configuration changes in the design of an optical system such as an illumination system. The tilted optical element 122 reflects collimated light to a position shifted or translated, but near, the source such as the monitor photodiode 108 location. By being able to receive the reflected light at the monitor photodiode, an effect or change outside the integrated circuit package can be detected by a standard component within an off-the-shelf light source package.

The black circles on the lower surface of the can or case 104 correspond to a lead or other connection (LD) from the package for connection by an input drive signal to the laser diode from control circuitry 126, a connector (PD) for an output signal from the photodiode 108 to the control circuitry 126, and a common or ground connector (COM) which may also be connected to the control circuitry 126.

Figure 3:
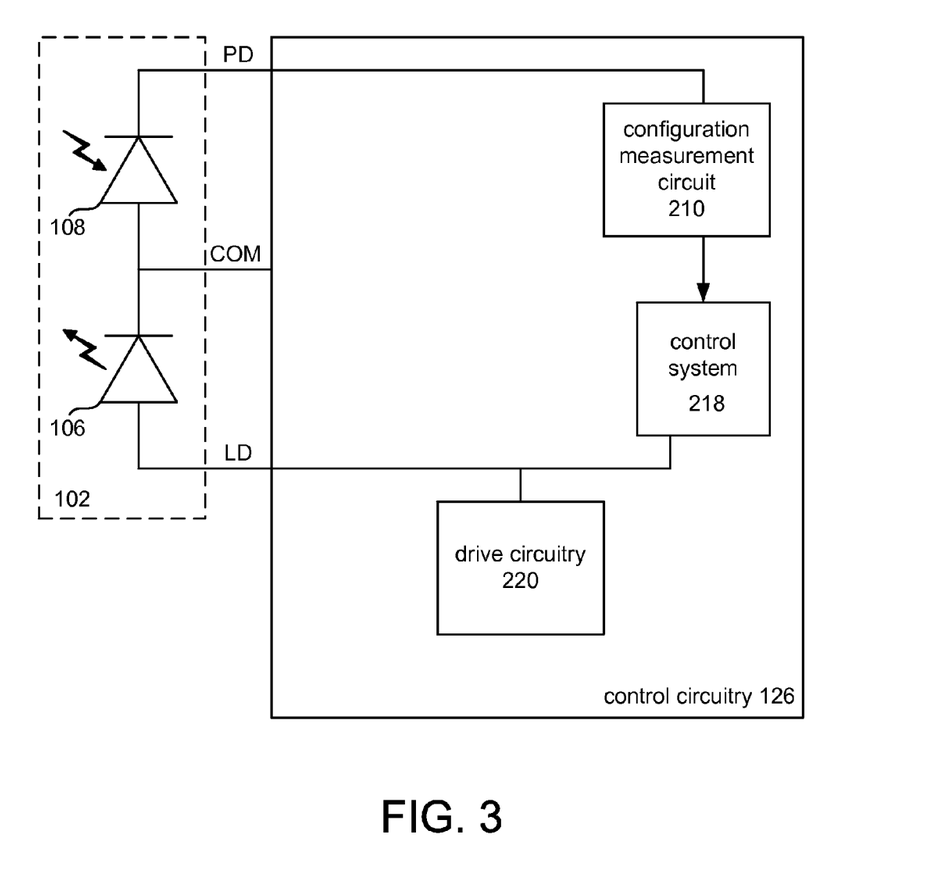
FIG. 3 is a block diagram of control circuitry in accordance with one embodiment for detecting a position configuration change of an element of the illumination system of FIG. 2.

FIG. 3 is a block diagram of control circuitry in accordance with one embodiment for detecting a position configuration change of an element of the illumination system of FIG. 2. The control circuitry 126 described is with respect to aspects for detecting configuration changes in an optical system using a laser or LED. Although not shown, the control circuitry 126 may include other known systems, for example a temperature control system, typically embodied in control circuitry for operating a laser or LED.

The laser diode lead LD is connected to a first lead of the control circuitry 126 which connects to a drive circuit 220 and a control system 218. When driving laser diode 102 to produce laser emissions, the control system 218 maintains a constant current input via drive circuit 220 in this example. The laser diode may be placed between the drive circuit 220 and common COM. The current level provided to the laser diode is compared by the control system 218 with a set drive current level. The set drive current level can be represented by an analog voltage and compared with the actual current level, also represented as an analog voltage. Using the difference between the two voltages, representing an error, the input level of current to the laser diode can be adjusted to maintain a constant input drive signal to the laser. By maintaining constant input power, in this example with current from a drive circuit 220 to the laser, the monitor photodiode 108 is not needed to monitor the output power of the laser in order to adjust the input power to achieve a selected output power.

Photodiode lead PD connects to a configuration measurement circuit 210 which in this example measures current. The type of photodiode used may output a current representative or based upon the light intensity received from the reverse illumination signal and the reflected light. In other examples, another characteristic of the output signal, for example voltage or phase or frequency, may be used as the measurement characteristic. The control system 218 includes logic which may be in the form of firmware or software instructions which determines if the measured current is outside of a threshold stored in a memory such as a flash or a read only memory. Outside of a threshold may be above or below the threshold. For example, a measurement or a number of measurements may be above or below a certain amount of current indicating the configuration of at least one element has changed.

In one example, a laser diode produces between about 190-200 milliwatts (mw) of power. The reverse illumination signal produces an output signal of about 500 microamps uA. The reflected light produces an increase of about 2000 uA so an output signal of 2500 uA indicates the elements of the illumination system are in their intended positions within the configuration. If the output signal drops off to about, for example, 1800 uA or below, the control system detects that there has been a change in the configuration position of the one or more optical elements outside the integrated light source package. Being outside the threshold is an example of a criteria for modifying the operation of the illumination system. For example, the criteria may be a shut down criteria in which the control circuitry 126 turns off the light source, the laser diode in this example. The control system 218 causes the drive circuit 220 to stop producing a drive signal for the laser diode 106 so the illumination system shuts down.

FIG. 4 is a block diagram in a perspective view of another embodiment of a laser diode illumination system comprising technology for detection of a change in the configuration of its elements. In this embodiment, the monitor photodiode 108 is used for its traditional purpose of measuring the reverse illumination signal which can be used as an indicator of the output power of the laser diode. Another photodiode 107 is used for measuring a property of the reflected light 114*b*. Extending from the can 104 are two photodiode connectors (PD1 and PD2) to which the control circuitry 126 connects to read the respective output signals of the two photodiodes 108 and 107.

Figure 5:
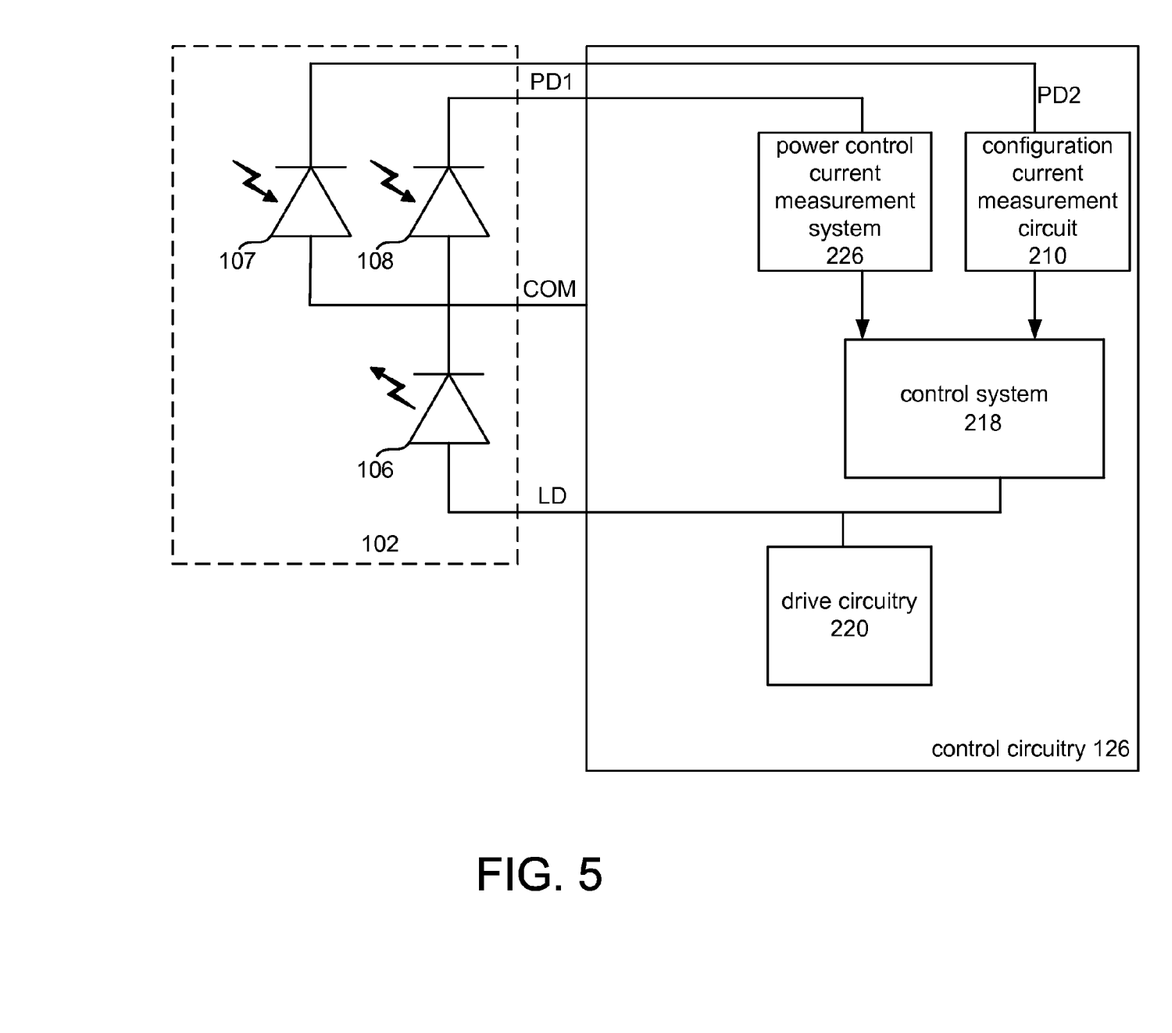
FIG. 5 is a block diagram of control circuitry in accordance with one embodiment for detecting a position configuration change of an element of the illumination system of FIG. 4.

FIG. 5 is a block diagram of control circuitry in accordance with one embodiment for detecting a position configuration change of an element of the illumination system of FIG. 4. In this example, the control system 218 receives current measurements from each of the photodiodes 107 and 108. A power control current measurement system 226 receives a current output signal representative of the reverse illumination signal which is representative of the output power of the illumination signal. By monitoring the output of the laser diode as feedback, the power output of the laser diode can be maintained by the control system 218 by adjusting the drive circuit 220. Instead of keeping the drive current to the laser constant as in FIG. 3, the drive current produced by the drive circuitry 220 may vary based on the feedback about the output power of the illumination signal.

The control circuitry processes the measurements of the configuration measurement circuit 210 as described above for FIG. 3 except the values will be reduced by the contribution of the reverse illumination signal.

In the embodiments above, different types of reflection may be used to reflect the light back to the light detector. For example, a mirror or other device with a surface having an angle of incidence of about zero may reflect a portion of the illumination back to the light detector. In another example, retro-reflection may be used wherein light is reflected back toward its source as minimally scattered light or at least less scattered than diffusely reflected light. In other examples, specular reflection where the angle of incidence is equal to the angle of reflection is used. Furthermore, other elements may be used to direct a portion of the illumination outside a package to a photodiode within the package by other optical techniques than reflection. For example, a portion of the light may be split off by a splitter and routed through optical elements back to the light detector. In another example, light could be diffracted to a light detector placed in the package.

Figure 6:
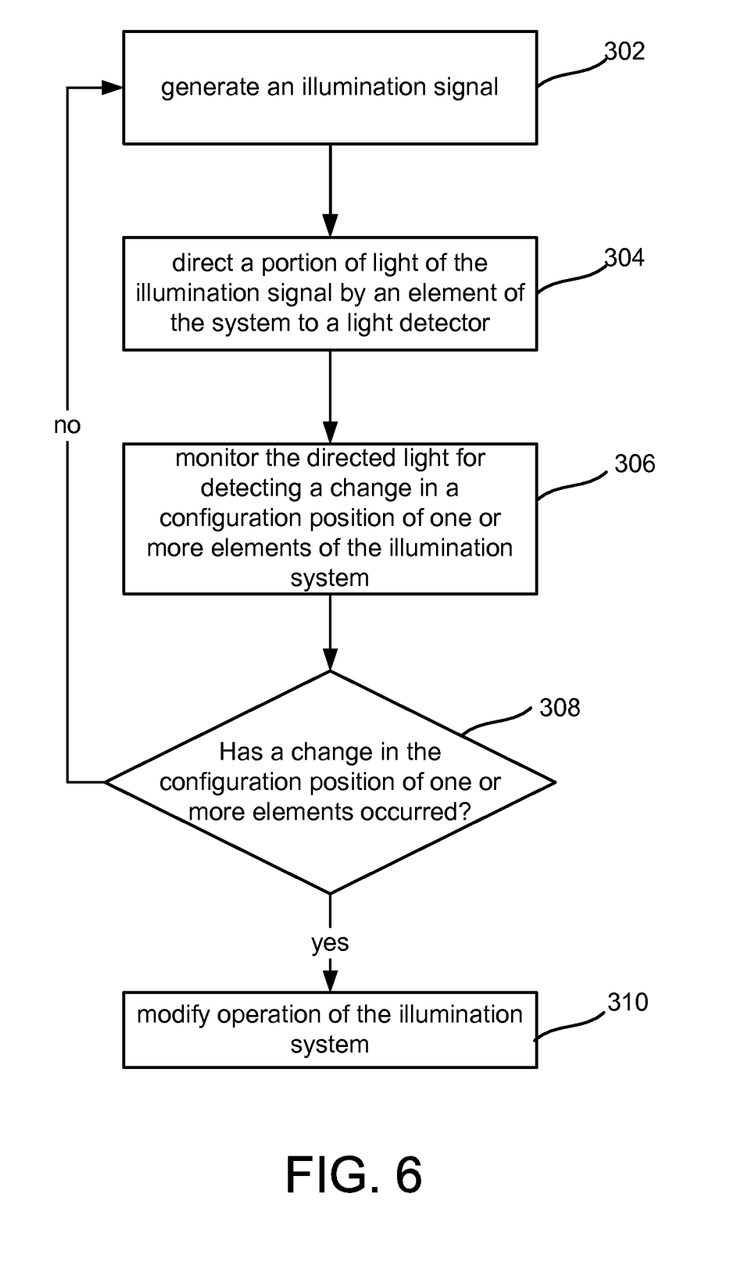
FIG. 6 is a flowchart of an embodiment of a method for detecting a change in a configuration position of one or more elements in an illumination system.

FIG. 6 is a flowchart of an embodiment of a method for detecting a change in a configuration position of one or more elements in an illumination system. For illustrative context for description but not to limit the method to the particular embodiments disclosed, reference is made to the elements of FIGS. 1A through 5. In step 302, a light source 106 generates an illumination signal. An element of the illumination system such as one or more tilted diffractive optical elements 122 as in FIG. 2 or the reflective areas 115*a* and 115*b* (for example being embodied as retro-reflective areas in some examples) of structural element 118 in FIG. 1B direct a portion of light of the illumination signal to a light detector 108 in step 304. The control circuitry 126 in step 306 monitors the directed light for detecting a change in a configuration position of one or more elements of the illumination system and determines in step 308 whether a change in the configuration position of one or more elements has occurred. Responsive to no change, the system continues operating by continuing to generate the illumination signal in step 302 and the monitoring of light directed back to the light detector. Responsive to a change in a configuration position of an element, the control circuitry 126 modifies operation of the illumination system in step 310. In many cases for safety and proper operation concerns, the step 310 results in shutting down the illumination system.

Figure 7:
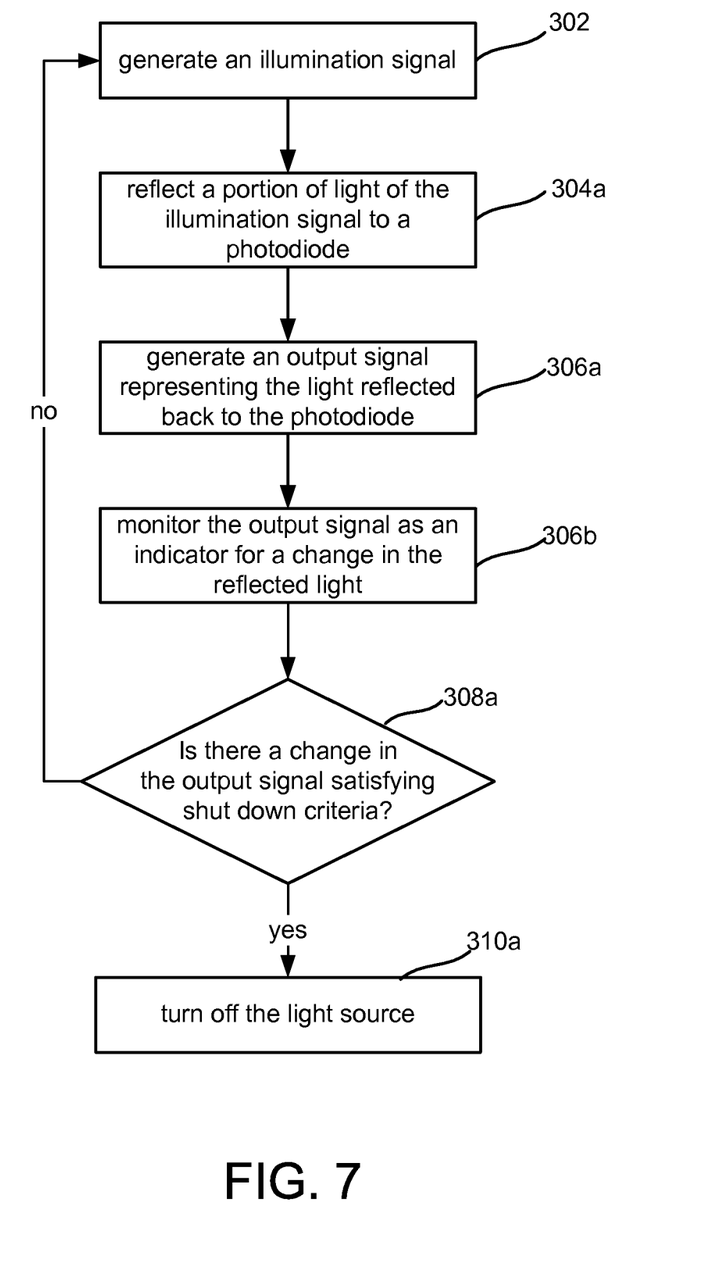
FIG. 7 is a flowchart of an implementation example of the method of FIG. 6 in an illumination system using reflected light as the indicator of a change in the position of one of the system's elements.

FIG. 7 is a flowchart of an implementation example of the method of FIG. 6 in an illumination system using reflected light as the indicator of a change in the position of at least one of the system's elements. Additionally, shut down is the modified operation in this example. In the example of FIG. 7, step 304 is implemented in step 304a by reflecting a portion of light of the illumination signal to a photodiode, for example the monitor photodiode in FIG. 2 or the other photodiode 107 in FIG. 4. Step 306 of monitoring detected light for detecting a change in a configuration position of one or more elements of the illumination system is implemented in step 306a by the photodiode 108, 107 generating an output signal representing the light-reflected back to the photodiode and in step 306b monitoring the output signal as an indicator for a change in the reflected light.

Step 308 of detecting a change is implemented in step 308a by detecting whether there is a change in the output signal satisfying shut down criteria, and step 310 of modifying operation is implemented as turning off the light source responsive to a change which satisfies the shutdown criteria. An example of shut down criteria is being outside a threshold. For example, if the configuration measurement circuit 210 returns values showing a significant fall off of about twenty-five percent or more of the output signal strength to the control system 218, the system 218 will stop the drive circuitry 220 from providing drive current to the laser diode 106 to turn it off. Other thresholds may also be used, e.g. 15% or 35%. Typically, a threshold value is picked so as not to cause a shutdown due to noise variations or the expected normal degradation of the light source output power, and hence light directed back to a light detector, during the lifetime of the light source.

Figure 8:
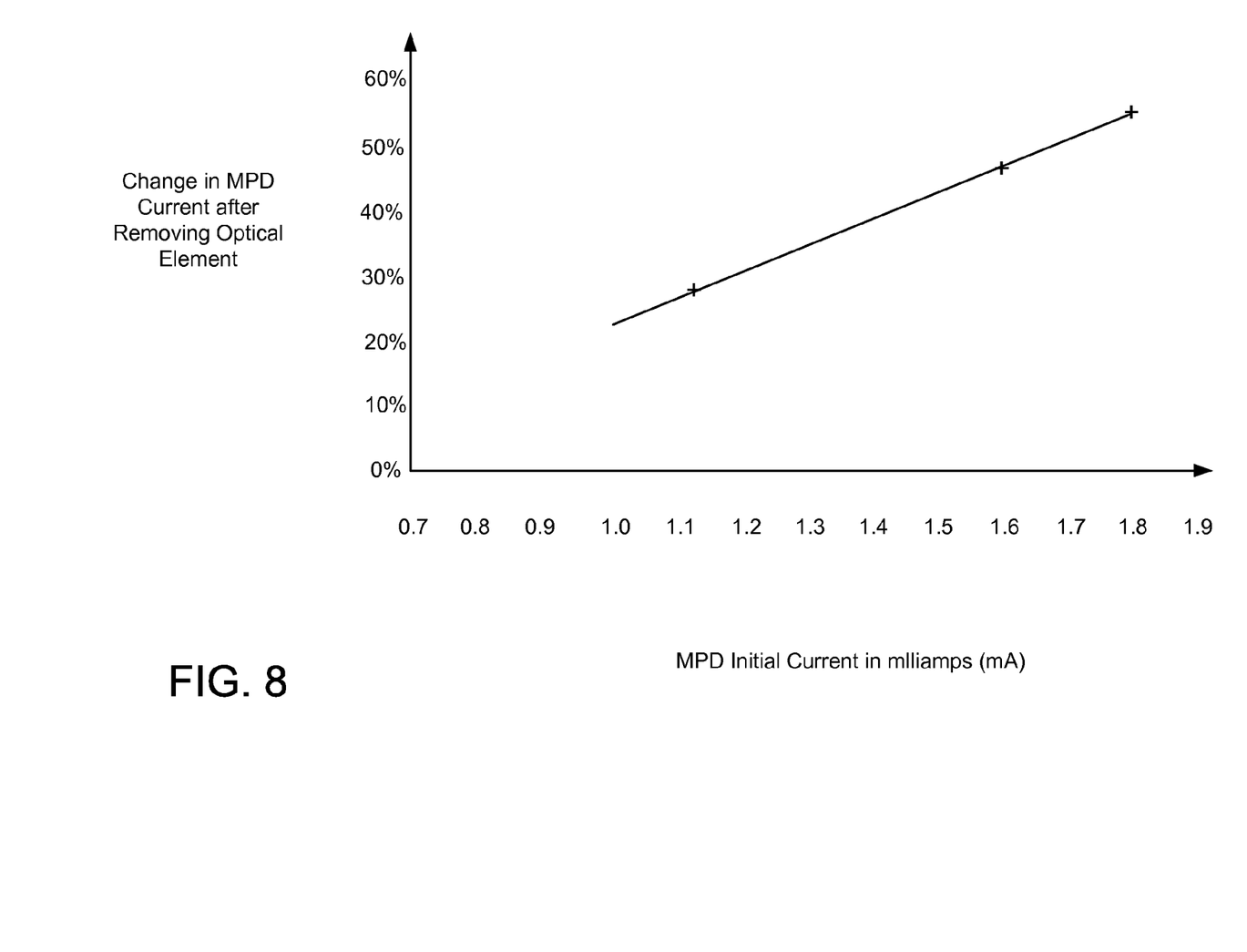
FIG. 8 is a graph illustrating some results of some data points for percentage changes in monitor photodiode current after removing an optical element vs. initial monitor photodiode currents before removal.

FIG. 8 is a graph illustrating some results of some data points for percentage changes in monitor photodiode current after removing an optical element versus initial monitor photodiode currents before removal. The results were obtained for a system such as that in FIG. 2 wherein the diffractive optical element 122 was removed. For an initial monitor photodiode current of about 1.125 milliamps (ma) before removal, the percentage change was between about 25 and 30 percent. At an initial current of 1.6 ma, the percentage change after removal was between about 45 and 50 percent. For an initial current of 1.8 ma, the percentage change was about 55 percent after removal. As indicated, the changes in this range of currents indicated a fairly linear and direct relationship between initial monitor photodiode current and percentage change due to removal of the diffractive optical element 122.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An illumination system comprising:
a light source configured to generate an illumination signal;
one or more optical elements aligned to direct a portion of light of the illumination signal;
a light detector positioned to receive light directed from the one or more optical elements, wherein the light detector is configured to generate an output signal based on the light directed from the optical element; and
control circuitry connected to monitor the output signal of the light detector, wherein the control circuitry is configured to detect a change in a configuration position of one or more elements of the illumination system.

2. The system of claim 1, wherein:
the light source is a laser and the light detector is a photodiode.

3. The system of claim 1, wherein:
the light source is a light emitting diode.

4. The system of claim 1, wherein:
the optical element has a reflective area on a surface of an interior side of a structure supporting the illumination system, the reflective area being configured to direct the portion of light of the illumination signal to the light detector.

5. The system of claim 1, wherein:
the optical element is a diffractive optical element, and the light directed from the diffractive optical element is surface reflected back to the light detector.

6. The system of claim 1, wherein:
the control circuitry includes a switch connected to the light source and operative for turning off the light source responsive to the change in the configuration position of one or more elements of the illumination system.

7. The system of claim 1, wherein:
the change in the configuration position of one or more elements of the illumination system indicates one of the group consisting of:
an optical element of the one or more elements has been removed;
an optical element of the one or more elements has been damaged;
an optical element of the one or more elements has been repositioned to cause a non-negligible effect;
a structural element of the one or more elements has been removed; or
a structural element of the one or more elements has been damaged.

8. The system of claim 1, wherein:
the one or more optical elements aligned to direct a portion of light of the illumination signal comprises an optical element for collimating the illumination signal and a tilted optical element for reflecting a portion of light of the collimated illumination signal.

9. The system of claim 8, wherein:
the tilted optical element has a tilt angle of less than three degrees with respect to an axis perpendicular to a direction of propagation of the illumination signal.

10. A method for detecting a change in a configuration position of one or more elements in an illumination system, the method comprising:
causing a light source to generate an illumination signal;
directing a portion of the illumination signal by at least one of the optical elements of the illumination system to a light detector;

monitoring a response of the light detector to the directed light for thereby detecting a change in the configuration position of one or more of the elements in the illumination system; and modifying operation of the illumination system responsive to detecting the change in the configuration position of the one or more elements.

11. The method of claim 10, wherein the directed light is reflected light.

12. The method of claim 10, wherein:

the directing the portion of light of the illumination signal by the element to the light detector further comprises reflecting the portion of the illumination signal to the light detector by a tilted optical element.

13. The method of claim 12, wherein:

control circuitry is used for monitoring the directed light for detecting the change in the configuration position of one or more elements in the illumination system and the method further comprises generating an output signal representing the light reflected back, and detecting the change in the configuration position of one or more elements of the illumination system by monitoring the output signal as an indicator for a change in the reflected light satisfying shut down criteria; and modifying operation of the illumination system responsive to detecting the change in the configuration position of one or more elements further comprises the control circuitry turning off the light source responsive to satisfaction of shut down criteria.

14. An illumination system comprising:

an integrated circuit light source package comprising within the package a light source for generating an illumination signal and a light detector;

an outer structural element of the illumination system for supporting the integrated circuit light source package and one or more optical elements located outside the package, including a reflective element for reflecting a portion of light of the illumination signal;

the light detector being positioned to receive light reflected back from the reflective element located outside the integrated circuit light source package;

the light detector generates an output signal based on the light reflected back from the reflective element; and control circuitry communicatively coupled to the light detector for monitoring the output signal of the light detector to determine whether there has been a change in the configuration position of the one or more optical elements outside the integrated circuit light source package.

15. The system of claim 14, wherein the reflective element is a diffractive element.

16. The system of claim 15, wherein the reflective element comprises a tilted optical element aligned with a collimating optical element to receive the illumination signal collimated.

17. The system of claim 16, wherein the change in the configuration position is indicated by a change of twenty-five percent or more in the output signal.

18. The system of claim 14, wherein:

the control circuitry is connected to the integrated light source package for decreasing the illumination signal of the light source responsive to the output signal indicating there has been a change in the configuration position of the one or more optical elements outside the integrated light source package.

19. The system of claim 14, wherein:

the control circuitry is connected to the integrated light source package for turning off the light source responsive to the output signal indicating there has been a change in the configuration position of the one or more optical elements outside the integrated light source package.

20. The system of claim 14, wherein:

the integrated circuit light source package is an off-the-shelf integrated circuit laser package wherein the light source is a laser and the laser also generates a reverse illumination signal;

the light detector is a monitor photodiode which is positioned to receive the reverse illumination signal; and the output signal represents the light reflected back from the reflective element outside the package and the reverse illumination signal.

* * * * *